Aug. 2, 1932.   A. K. FREDERICK   1,869,679
MACHINE FOR UNLOADING CEMENT
Filed Sept. 11, 1930
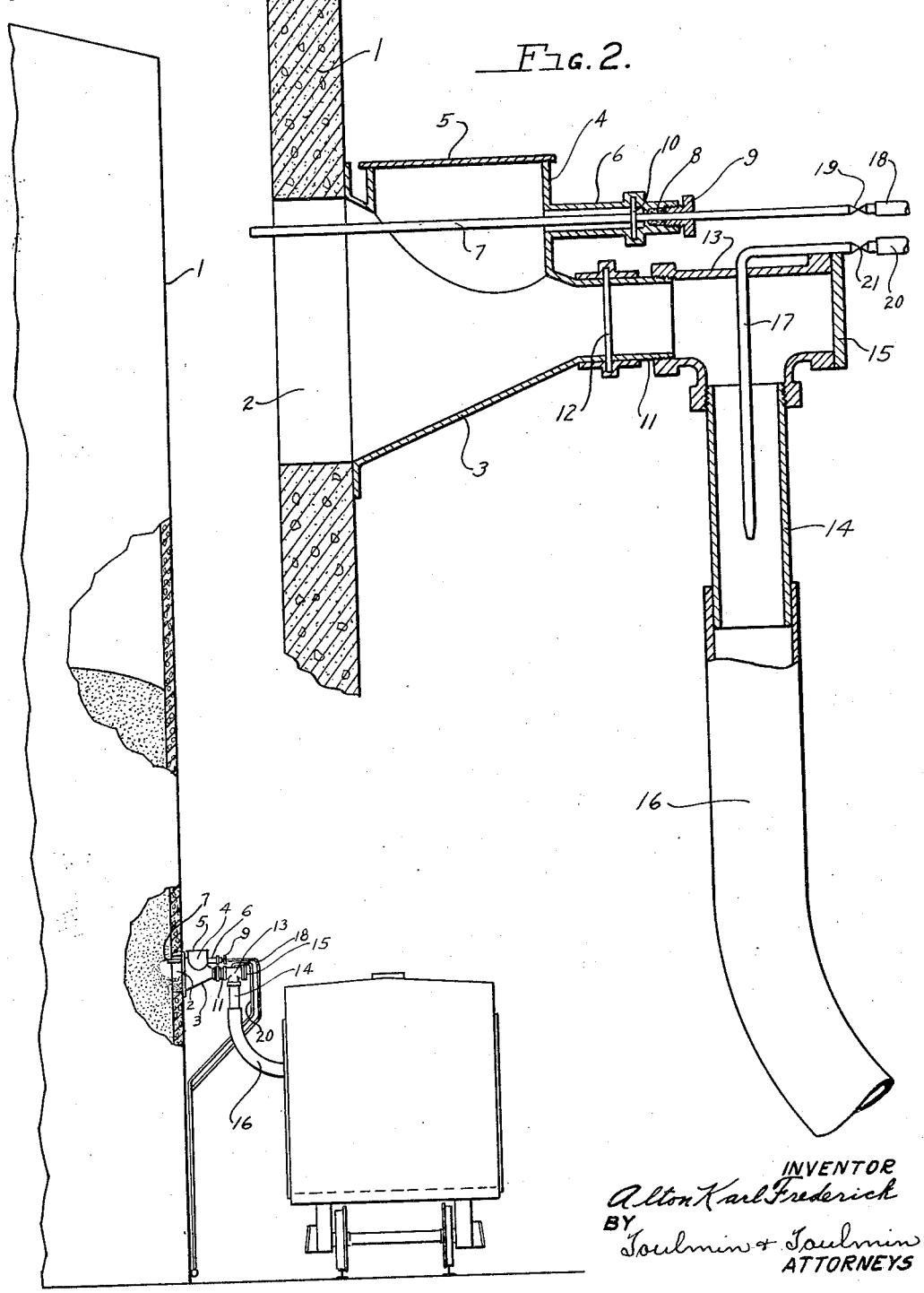
INVENTOR
Alton Karl Frederick
BY
Toulmin & Toulmin
ATTORNEYS Patented Aug. 2, 1932

1,869,679

UNITED STATES PATENT OFFICE

ALTON K. FREDERICK, OF OSBORN, OHIO, ASSIGNOR TO SOUTHWESTERN PORTLAND CEMENT COMPANY, OF OSBORN, OHIO, A CORPORATION OF DELAWARE

MACHINE FOR UNLOADING CEMENT

Application filed September 11, 1930. Serial No. 481,095.

This invention relates to a machine and the method of loading cement, and has for its object to provide an improved apparatus for loading cement and other pulverized and finely divided materials into a conveyor or transporting vehicle.

It is particularly the object of the invention to provide an apparatus adapted to be attached to one side of a silo, or some similar container, and agitate the loose material in the container and convey the loose material from the container to a receiving receptacle, which may be a railroad car, truck or some similar object.

It is a further object of this invention to provide an apparatus adapted to be attached to one side of a container over an opening therein, through which the loose material is to pass, and stir or agitate the material adjacent the hole or opening and remove the agitated material from the container by means of suction and air pressure.

It is also an object of this invention to provide, in connection with a receptacle in which there is located cement or similar finely divided material, by forcing into the container adjacent an exit hole therein, blasts of air for agitating and stirring the contents of the container and drawing the agitated or stirred contents from the container by means of enforced suction and pressure.

These and other advantages will appear from the description taken in connection with the drawing.

Referring to the drawing:

Figure 1 is a view of one side of a silo or receptacle for containing finely divided materials, with a part of the wall removed therefrom showing the unloading apparatus attached thereto.

Figure 2 is a vertical section through a fragmentary part of the wall and through the loading apparatus.

This apparatus is adapted to be attached to and fit over an opening in the wall of a container, and may be used in connection with various sizes and types of containers, and may be used in connection with the loading of various kinds of granulated or pulverized materials, or materials composed of relatively fine particles.

In the present instance it is shown used in connection with a silo, indicated by the numeral 1. This silo may be made of any suitable material. In the present instance it is shown to be made of concrete. This silo has near the bottom thereof an opening 2, over which the apparatus fits and for which it forms an inclosure. The part of the apparatus immediately associated with the opening 2 may be considered a discharge spout. The part of this discharge spout adjacent and attached to the wall of the container is funnel shaped and indicated by the numeral 3, and forms a receiving hopper to receive the contents of the container as the contents are being loaded.

On the upper part of the hopper is a box-like structure 4, which has an inspection door 5 therein. This door may have therein a glass opening in order that the condition of the material discharged may be observed, and in case any lumps accumulate in the hopper they may be removed through the door, or may be crushed by inserting some crushing implement through the door. The door is fastened to the boxing in any suitable manner.

Extending horizontally from the boxing is a cylindrical extension 6, which has extending longitudinally therethrough an air pipe 7. This air pipe is supported in the outer end of the extension by means of a packing 8 and a packing gland 9 threaded into the end of the extension. The pipe 7 extends through the center of the gland. The packing and the gland form an air-tight closure on the end of the extension.

There is also located in this extension, intermediate the ends thereof, a cut-off valve 10 which is to be withdrawn for the insertion of the pipe 7 through the packing gland 9 and the extension 6. When this pipe 7 is withdrawn from the extension 6 the valve is placed across the extension 6 for closing the opening for the pipe 7. The part of the hopper remote from the wall of the container merges into a neck 11, which has therein a cut-off valve 12. This valve is used for cutting off the passageway so the material cannot pass from the container when it is not desired. On the outer end of the neck a T-member 13 is screw threaded. Into one part of this T-member, at a right angle to the neck 11, a pipe 14 is threaded. The other end of the T-member, opposite the neck 11, is closed by means of a cap or plate 15. All of these connections and inclosures are air-tight so that no air can get into the apparatus except as intended and for the purposes desired. Attached to the lower end of the discharge pipe 14 is a loading hose 16, which may be any length and has its free end inserted in the receptacle to be loaded, be it car, truck or what not.

Extending into the T-member and into the center of the discharge pipe is an injector pipe 17. The connection between this injector pipe 17 and the wall of the T-member through which it passes is air-tight so that no air can get in around the pipe. Each of the pipes 7 and 17 is connected to an air hose, which is connected to some source of compressed air. The hose connected to the pipe 7 is indicated by the numeral 18, and between this hose and the pipe 7 is a regulating valve 19 for controlling the amount of air and the amount of air pressure admitted to pipe 7. In connection with the pipe 17 a similar hose 20 is used, and between this hose and the pipe 17 is a regulating valve 21. This pipe is also connected to some source of air pressure.

The pipes 7 and 17 are about a half-inch in diameter and the hose 18 and 20 are about the same size. The air pressure admitted through the pipe 7 into the container is about eighteen pounds, while the pressure admitted through pipe 17 into the discharge pipe for creating a suction, is about thirty pounds. The pressure of the air in these pipes may be varied by manipulating the valves 19 and 21. While the injector pipe 17 is about a half-inch in diameter, its exit end is reduced to about five-sixteenths of an inch so that the air leaving this pipe will have a greater force and create a greater suction.

In operation this apparatus is attached to one side of a container, as shown in Figure 1. This container is filled with some loose material and closed at the top. The valve 12 is open, air is admitted through pipe 17 into the container for the purpose of agitating or stirring and loosening the material within the container, and while this air loosens the material it also serves to produce pressure within the container and thereby serve to eject the material from the container. The ejecting effect of the air forced through pipe 7 is secondary, its main object being to agitate the material within the container.

While the material is being thus agitated by the compressed air from pipe 7, the valve 12 is opened and compressed air admitted through pipe 17 into the discharge pipe 14. The force of air leaving the exit end of the injector pipe creates suction in the discharge spout so that the loosened material from the container is drawn through the spout and passes down through the hose 16 into the receptacle being loaded. The discharge spout as a whole includes the hopper 3, the discharge pipe 14 and the T-member connecting the two.

It will be observed from an examination of Figure 2 that this apparatus is composed of few parts, easily manufactured, easily assembled and easily attached to the container from which the material is to be loaded. While the apparatus is shown to be used in connection with a silo in which cement is stored, it may be used in connection with containers for various kinds of loose material. In the event that the material becomes clogged and cannot be broken up by the force of the compressed air through pipe 7, the particles may be broken up by means of some tool inserted through the door 5.

I desire to comprehend within my invention such modifications as may be clearly embraced within my claims and the scope of my invention.

Having thus fully described my invention, what I claim is new and desire to secure by Letters Patent is:

1. A loading apparatus for loose material comprising a discharge spout having a receiving hopper and a discharge pipe, a compressed air agitator pipe extending through said hopper and beyond the receiving end thereof, and a compressed air injector pipe extending into said discharge pipe and in the direction of the discharge end thereof.

2. A loading apparatus for loose material comprising a discharge spout having a receiving hopper and a discharge pipe, a compressed air agitator pipe extending through said hopper and beyond the receiving end thereof, a compressed air injector pipe extending into said discharge pipe and in the direction of the discharge end thereof, and means for regulating the pressure of the air discharged by the agitator pipe and by the injector pipe.

3. A loading apparatus for loose material comprising a discharge spout having a receiving hopper and a discharge pipe, an inspection door in one side of the hopper, a compressed air agitator pipe extending through the hopper and terminating adjacent the receiving end thereof, a compressed air injector pipe extending into the discharge pipe and in the direction of the discharge end thereof, and means in said air pipes to regulate the pressure of the air discharged therefrom.

4. A loading apparatus for loose material comprising a discharge spout having a receiving hopper, a discharge pipe and cut-off valve between the hopper and pipe, an inspection door on one side of the hopper, a compressed air agitator pipe supported by the hopper and terminating adjacent the intake end thereof, and a compressed air injector pipe extending into the discharge pipe.

In testimony whereof, I affix my signature.

ALTON K. FREDERICK.